United States Patent [19]

Cooper et al.

[11] 4,116,939

[45] Sep. 26, 1978

[54] INTRINSIC VISCOSITY CONTROL OF POLYPHENYLENE ETHER REACTION MIXTURES

[75] Inventors: Glenn Dale Cooper, Delmar; Daniel Edwin Floryan, Glenmont, both of N.Y.

[73] Assignee: General Electric Company, Pittsfield, Mass.

[21] Appl. No.: 752,023

[22] Filed: Dec. 20, 1976

[51] Int. Cl.$^2$ ............................................ C08G 65/44
[52] U.S. Cl. .................................... 528/215; 260/860; 260/874; 528/486
[58] Field of Search ..................... 260/47 ET, 860, 874

[56] References Cited

U.S. PATENT DOCUMENTS

| | | | |
|---|---|---|---|
| 3,635,890 | 1/1972 | Takemura et al. | 260/47 ET |
| 3,838,102 | 9/1974 | Bennett et al. | 260/47 ET |
| 3,951,917 | 4/1976 | Floryan et al. | 260/47 ET |
| 3,954,904 | 5/1976 | Yonemitsu et al. | 260/873 |

*Primary Examiner*—Lester L. Lee
*Attorney, Agent, or Firm*—Morgan, Finnegan, Pine, Foley & Lee

[57] ABSTRACT

Polyphenylene ethers produced by an oxidative coupling of a phenol in the presence of an oxygen-containing gas and a metal-amine complex catalyst are freed of catalyst and stabilized against molecular weight loss. Removal of the metal component and molecular weight loss control are effected by contacting the reaction mixture with an aromatic amine plus a metal chelating agent, which stabilizes the intrinsic viscosity of the polyphenylene ether in the reaction mixture. This procedure results in lower catalyst usage and shorter reaction time.

25 Claims, No Drawings

INTRINSIC VISCOSITY CONTROL OF POLYPHENYLENE ETHER REACTION MIXTURES

This invention relates to synthetic resins produced from phenols, and, more particularly, to control of the molecular weight of polyphenylene ether resins by stabilizing the intrinsic viscosity of polyphenylene ether in the reaction mixtures.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-contained gas through a reaction solution of a phenol and a metal-amine complex catalyst. In the Stamatoff patents, the polyphenylene ethers are produced by reacting the corresponding phenolate ion with an initiator, such as peroxy acid salt, an acid peroxide, a hypohalite, and the like, in the presence of a complexing agent.

Other disclosures relating to processes for preparing olyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. Nos. 3,337,499; Blanchard et al., 3,219,626; Laakso et al., 3,342,892; Borman, 3,344,166; Hori et al., 3,384,619; Faurote et al., 3,440,217; and disclosures relating to metal based catalysts which do not include amines, are known from patents such as Wieden et al., U.S. Pat. Nos. 3,442,885 (copper-amidines); Nakashio et al., 3,573,257 (Metal-alcoholate or -phenolate); Kobayashi et al., 3,455,880 (cobalt chelates); and the like. Disclosures relating to non-catalytic processes, such as oxidation with lead dioxide, silver oxide, etc., are described in Price et al., U.S. Pat. No. 3,382,212. Additional methods of preparing polyphenylene ethers are described in Bennett et al., U.S. Pat. Nos. 3,639,656; Cooper et al., 3,642,699 and 3,661,848, and copending, commonly assigned U.S. patent applications Ser. No. 718,834, filed Aug. 30, 1976, and Ser. No. 718,836, filed Aug. 30, 1976. All of the above-mentioned disclosures are incorporated herein by reference.

The processes most generally used to produce the polyphenylene ether resins involve the self-condensation of a monovalent phenol in the presence of an oxygen-containing gas and a catalyst comprising a metal-amine complex.

At the conclusion of the reaction, the reaction solutions obtained, e.g., by oxidizing 2,6-xylenol with a copper-amine catalyst, are extracted with aqueous mineral acid or acetic acid or a mixture of water and carbon dioxide to remove the metallic component of the catalyst and the amine, before isolation of the polymer of precipitation with an anti-solvent, such as methanol. It is important to remove the metallic catalyst residue from the reaction solution (and the polymer) because contamination of the polymer by metallic residues results in discoloration and degradation.

In Bennett et al., U.S. Pat. No. 3,838,102, a new method is described which is extremely effective for removing metallic residues from polyphenylene ether reaction mixtures. The method yields polymer with very low metal content after precipitation either conventionally by adding an antisolvent or by total isolation procedures. The method of U.S. Pat. No. 3,838,102 involves adding a polyfunctional compound to the reaction mixture, the compound being capable of selectively complexing with the metallic component of the catalyst, to decompose the catalyst complex and to form a water soluble, extractable composition of the metal and the polyfunctional compound.

Molecular weight control problems are also encountered, however. It is known that, when polyphenylene ether reaction mixtures are allowed to stand for appreciable periods before isolation of the polymer, the intrinsic viscosity (I.V.) of the polyphenylene ether is reduced. The extent of the I.V. drop depends on the time between reaction and isolation, the temperature of the mixture, and probably on the conditions used in preparing the polymer. In typical large scale operations, with the reaction mixture held at 50° C., the I.V. drop is usually more than 0.1 dl./g. per hour, and drops greater than 0.2 dl./g. per hour are not uncommon.

In practice, an attempt is made to compensate for this degradation by adjusting the polymerization conditions to prepare a polymer of substantially higher I.V. than that desired in the final product, so that after the I.V. drop between reaction and isolation, the intrinsic viscosity will fall in an acceptable range. However, this method is expensive, because more catalyst is required than would otherwise be necessary, and difficult to control, because the amount of the I.V. drop may vary widely, especially when the interval between the end of the polymerization and precipitation of the polymer is prolonged for any reason. A method for stabilizing the reaction mixtures, that is, preventing or minimizing the I.V. drop in polyphenylene ether reaction mixtures, is, therefore, extremely useful.

German Offen. No. 2,430,130, Jan. 23, 1975, discloses a method for stabilizing the I.V. in polyphenylene ether reaction mixtures by adding a mixture of a dihydric phenol such as hydroquinone or catechol, or a benzoquinone, and a mild reducing agent, such as sodium sulfite. The publication teaches that the dihydric phenol should be used in an amount greater than two moles per gran-atom of the copper or other metal catalyst used in the polymerization, and preferably, at a level of at least 5 moles per gram-atom.

It has been proposed to treat the polyphenylene ether reaction mixture with a combination of (i) a dihydric phenol/reducing agent and (ii) a chelating agent for the metal catalyst, such as a salt of ethylenediaminetetraacetic acid or nitrilotriacetic acid. By such treatment, intrinsic viscosity degradation may be prevented with much smaller amounts of the dihydric phenol than are taught to be necessary in the above-mentioned German publication.

Unexpectedly, it has now been found that certain classes of aromatic amines, used in combination with a metal chelating agent, stabilize the I.V. of polyphenylene ether in polyphenylene ether reaction mixtures.

It is, therefore, a primary object of this invention to control the intrinsic viscosity of phenyphenylene ether in the polyphenylene ether reaction mixture.

It is also an object of this invention to stabilize the molecular weight of polyphenylene ether resin.

Still another object of this invention is to provide a method of preparing polyphenylene ether resin wherein the method results in lower catalyst usage and shorter reaction time.

DESCRIPTION OF THE INVENTION

According to the present invention, in a process for forming a polyphenylene ether by an oxidative coupling reaction in the presence of a chelatable metal ion-amine complex catalyst comprising passing an oxygen-containing gas through a reaction solution of a phenol and said catalyst, the improvement comprises terminating the reaction and stabilizing the polymer against molecular weight degradation by contacting the reaction solution with (i) a chelating agent for such metal ion in combination with (ii) an aromatic amine, and recovering the polyphenylene ether from the reaction solution.

The term "polyphenylene ether" includes those polymers disclosed and claimed in Hay, U.S. Pat. Nos. 3,306,874 and 3,306,875, whenever produced by an oxidative coupling reaction comprising passing an oxygen-containing gas through a reaction solution of a phenol and a metal-amine complex catalyst. The term in its broadest sense includes various copolymers and compositions of the polyphenylene ethers formed by interpolymerization with other monomers or polymers, such as the polyolefins, polystyrenes, polycarbonates, and the like.

In general, the polyphenylene ether resins will be of the formula:

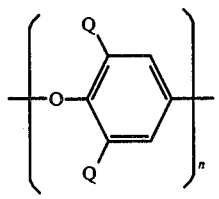

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenol nucleus, hydrocarbonoxy radicals, and halohydrocarbonoxy radicals having at least two carbon atoms between the halogen atom and the phenol nucleus.

The polyphenylene ethers are made by treating a solution of the corresponding phenol, optionally substituted with chlorine, bromine, or iodine in the para-position, with an oxygen-containing gas in the presence of a metal ion-amine complex catalyst. The metal component can comprise copper, manganese, cobalt, nickel, vanadium, chromium, and salts thereof, but copper is preferred. Primary, secondary, and tertiary amines may be used as the amine component of the catalyst. The reaction solvent can be halogenated aliphatic solvent, e.g., trichloroethylene, or an aromatic solvent, e.g., benzene, toluene, xylene, chlorobenzene, nitrobenzene, and the like, as well as many others which will be obvious to those skilled in this art. Especially preferred solvents are aromatic hudrocarbons, e.g., toluene or benzene.

The polyphenylene ether-forming reaction can be carried out under a wide variety of well-known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25° to 50° C. The degree of polymerization is primarily controlled by the reaction time, although catalyst activity, promoters, temperature, oxygen flow rate and other parameters have known effects. Details of the process are set forth in the above-mentioned Hay patents.

At the point where the polymerization reaction reaches the desired degree of polymerization and the polymer reaches the desired molecular weight, the reaction solution will comprise a solution of polyphenylene ether, typically from 3 to 50% by weight and usually from 10 to 30% by weight; metal and amine, typically from about 0.005 to 1.5% by weight of metal and from about 0.1 to about 5.0% by weight of amine; and minor amounts of other materials, such as various promoters, byproducts, unreacted monomer, and the like. Such reaction solutions are then treated with the chelating agents and the molecular weight stabilizing aromatic amines in accordance with the present process.

The aromatic amines useful in this invention include the ortho- and para-aminophenols and their N-substituted derivatives, as well as corresponding salts. The aromatic ring may have other substituents in addition to amine and hydroxyl groups, such as one or more halogen atoms or lower alkyl or aryl groups. Among the useful aromatic amines are o-aminophenol, p-aminophenol, o-phenylenediamine, p-phenylenediamine, p-N-methylaminophenol sulfate, 2,6-dichloro-1,4-phenylenediamine, N,N-di-isopropyl-p-phenylenediamine, N, N'-diphenyl-p-phenylenediamine, and the like. Many of these compounds are commercially available products, used as photographic developers, anti-oxidants for polyolefins, rubber antiozonants, etc.

Although relatively large amounts of the aromatic amines can be used, e.g., up to about twenty pounds per thousand pounds of polyphenylene ether, in commercial operation the amount should not exceed approximately ten pounds per thousand pounds of polyphenylene ether. The lower limit seems to be about 1 pound per thousand pounds, and very useful results are obtained with from about three to five pounds of aromatic amine per thousand pounds of polyphenylene ether.

A wide variety of chelating agents are effective in the present process, the choice being primarily dictated by economic considerations. They may be organic as well as inorganic in nature. In general, however, the preferred agents will comprise a polyfunctional carboxylic acid-containing compound, such as sodium potassium tartrate, nitrilotriacetic acid, citric acid, glycine and especially preferably, they will be selected from polyalkylenepolyamine polycarboxylic acids, aminopolycarboxylic acids, aminocarboxylic acids, polycarboxylic acids and their alkali metal, alkaline earth metal or mixed alkali metal-alkaline earth metal salts. For example, the preferred agents will include ethylenediaminetetraacetic acid, hydroxyethylethylenediaminetriacetic acid, diethylenetriaminepentaacetic acid and their salts. Special mention is made of ethylenediaminetetraacetic acid or a mono-, di-, tri and tetrasodium salt thereof and of nitrilotriacetic acid and their corresponding salts. In addition, polyamines, e.g., of the formula:

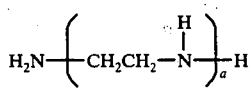

wherein $a$ is 1 to 5, such as diethylenetriamine or triethylenetetramine, can also be used as chelating agents. These are especially attractive economically because they allow elimination of any decantation or centrifugation step. For further information, see copending, commonly assigned U.S. patent application Ser. No. 428,450, filed Dec. 26, 1973, which is incorporated herein by reference.

Although relatively large amounts of the chelating agents can be used, e.g., from 0.1 mole to about 100 moles per mole of metal ion in the reaction solution, it is economically advantageous to select an amount which is sufficient to provide from about 0.5 to about 5.0 moles and preferably, from about 1 to about 2 moles of chelating agent per gram-atom of metallic catalyst component.

Reducing agents are not necessary for I.V. stability, but they may be added for other reasons, such as to improve the color of the polyphenylene ether product. Mild reducing /agents are generally suitable. A mild reducing agent is one which donates electrons readily but still is not capable of completely reducing the metallic ion catalyst component under the conditions of the process. Illustrative reducing agents comprise sulfur suboxides, such as sulfur dioxide or sulfurous acid, sodium bisulfite or sodium thionite, salts of metals in the lower valences of those compounds, such as tin (II) chloride, iron (II) sulfate, chromium (II) sulfate or titanium (III) chloride. Also suitable are nitrogen-containing reducing agents, such as hydroxylamines and their salts, also phosphites, such as diethylphosphite and mild organic reducing agents like glucose. Especially preferred is sodium sulfite.

The reducing agent is preferably used in an amount to provide at least two moles per gram-atom of metal ion component in the catalyst, but lesser amounts can be used. No particular advantage will be seen in using very high amounts, e.g., more than about ten moles of reducing agent per gram-atom of ionic metal catalyst component.

The reaction solution can be contacted with the chelating agent first and then with the aromatic amine, or it can be done simultaneously, or the order can be reversed. The chelated metallic catalyst component can then be extracted with water, followed by centrifuging or decanting to obtain a catalyst free polymer solution, and then the polymer can be recovered. Ordinarily the water produced in the polymerization reaction is sufficient for the extraction; however, additional water may be added if desired.

The manner of isolating the polyphenylene ether is not critical to the invention. For example, the polyphenylene ether can be isolated by precipitation from a reaction solution with an excess of an alcohol, such as methanol. The filtered product can be slurried in alcohol and, if desired, stirred with a decolorizing agent and then the polyphenylene ether is filtered off and converted to films, fibers, molded articles, and the like, by conventional methods.

Alternatively, because the polyphenylene ether solutions have such low metal content and the molecular weight is controlled, they tend themselves to recovery of the polymers by the so-called total isolation procedures, e.g., spray drying and steam precipitation. These are advantageous because they are more economical with respect to process energy requirements, solvent losses, and the like, than the precipitation methods mentioned above.

DESCRIPTION OF THE PREFERRED EMBODIMENTS

The following examples serve to illustrate the invention and are not intended to limit it thereto.

Intrinsic viscosity was determined by measurement in chloroform at 30° C.

EXAMPLE I

A stirred ten-gallon reactor was charged with 4.0 gal of toluene, and a solution of 3.73 g of cuprous oxide in 86 g of 48% aqueous hydrobromic acid was added. This was followed by 55 g of di-n-butyl amine, 17.9 g of N,N'-di-tertbutylethylenediamine, 105.7 g of butyldimethylamine, 5.5 g of methyltrioctylammonium chloride, and 3130 ml of methanol containing 5.5% water. Oxygen was introduced at a rate of 70 cubic feet/hr., and a solution of 12.2 lbs. of 2,6-xylenol in an equal weight of toluene was added over a period of 30 minutes with the temperature maintained at 40° C for the first 60 minutes, then increased to 50° C.

After eighty minutes the oxygen was displaced by nitrogen and the mixture was diluted to 16% polymer by addition of toluene; two liters of water and 62 g of a 30% aqueous solution of the disodium salt of nitrilotriacetic acid were added. Four 75 g portions of the mixture were withdrawn, and 0.09 g of sodium sulfite were added to each. To one sample also was added 0.031 g of p-aminophenol, to another 0.040 g of p-phenylene diamine, and to a third 0.048 g of p-N-methylaminophenol sulfate. A portion of the mixture was precipitated immediately with methanol and the four samples were thoroughly shaken and heated for 40 minutes at 80° C, then precipitated with methanol.

A second polymerization was carried out in the same way and 75 g sampls were treated with the aromatic amines as described above, but without the addition of sodium sulfite. The intrinsic viscosities are listed in the following table:

TABLE I

| Aromatic Amine | Amt. of Amine* | Amt. of Na$_2$SO$_3$* | Intrinsic Viscosity** Initially | After heating (40 mins. at 80° C) |
|---|---|---|---|---|
| None | — | 7.5 | .54 | .42 |
| p-aminophenol | 2.6 | 7.5 | .54 | .55 |
| p-phenylene-diamine | 3.3 | 7.5 | .54 | .55 |
| p-N-methylamino-phenol sulfate | 4.0 | 7.5 | .54 | .55 |
| None | — | — | .52 | .40 |
| p-aminophenol | 2.1 | — | .52 | .49 |
| p-phenylene-diamine | 2.7 | — | .52 | .52 |
| p-N-methylamino-phenol sulfate | 3.2 | — | .52 | .52 |

*g/1000g polyphenylene ether
**dl/g

It is seen that the molecular weight of the poly(2,6-dimethyl-1,4-phenylene)ether is efficiently stabilized when each of the above aromatic amines is employed in combination with a chelating agent. In the samples without an aromatic amine additive, the I.V. dropped 0.12 dl/g. The addition of sodium sulfite had no demonstrable effect.

EXAMPLE II

Polymerization was carried out as described in Example I, except that the catalyst was increased to 4.86 g of cuprous oxide in 129 g of 48% hydrobromic acid. After 100 minutes the mixture was diluted as above, and 2000 ml of water and 120 g of a 39% aqueous solution of the trisodium salt of ethylenediaminetetraacetic acid were added. A sample of the mixture was precipitated immediately with methanol. The polymer had an intrinsic viscosity of 0.53 dl/g. Another sample was heated for 40 minutes at 80° C and then precipitated. It had an intrinsic viscosity of 0.39 dl/g. A third sample of 60 g was shaken with 0.051 g of an aromatic amine, N,N'-diphenyl-p-phenylenediamine, and 0.07 g of sodium sulfite and heated for 40 minutes at 80° C. The intrinsic viscosity of the polymer precipitated after heating was 0.52 dl/g. These results as set forth below in tabular form, show the molecular weight control resulting from adding the aromatic amine plus the chelating agent:

TABLE II

| Aromatic Amine | Amt. of Amine* | Amt. of Na$_2$SO$_3$* | Intrinsic Viscosity** | |
|---|---|---|---|---|
| | | | Initially | After heating (40 mins. at 80° C) |
| None | — | — | 0.53 | 0.39 |
| N,N'-diphenyl-p-phenylenediamine | 5.3 | 7.3 | 0.53 | 0.52 |

*g/1000g polyphenylene ether
**dl/g

We claim:

1. In a process for forming a polyphenylene ether by an oxidative coupling reaction in the presence of a chelatable metal ion-amine complex catalyst comprising passing an oxygen-containing gas through a reaction solution of a phenol and said catalyst, the improvement which comprises terminating the reaction and stabilizing the polymer against molecular weight degradation by contacting the reaction solution with (i) a chelating agent for such ion, the chelating agent being present in an amount from 0.1 mole to about 100 moles per mole of metal ion in the reaction solution, in combination with (ii) an aromatic amine, the aromatic amine being present in an amount of from about 1 to about 20 pounds per thousand pounds of polyphenylene ether, and recovering the polyphenylene ether from the reaction solution.

2. The process of claim 1 wherein the chelating agent is a polyalkylene polyamine polycarboxylic acid, an aminopolycarboxylic acid, aminocarboxylic acid, a polycarboxylic acid, or an alkali metal salt, an alkaline earth metal salt, or mixed alkali metal-alkaline earth metal salt thereof or a polyamine of the formula:

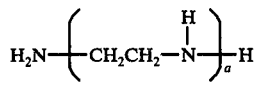

wherein $a$ is a whole number of from 1 to 5.

3. The process of claim 2 wherein the chelating agent comprises ethylenediaminetetraacetic acid or a mono-, di-, tri- or tetrasodium salt thereof.

4. The process of claim 2 wherein the chelating agent is nitrilotriacetic acid or a mono-, di-, or trisodium salt thereof.

5. The process of claim 2 wherein the chelating agent comprises glycine or a sodium salt thereof.

6. The process of claim 2 wherein the chelating agent is citric acid or a sodium salt thereof.

7. The process of claim 2 wherein the chelating agent is diethylene triamine.

8. The process of claim 2 wherein the catalyst is triethylenetetramine.

9. The process of claim 1 wherein the chelating agent is present in an amount sufficient to provide from about 1.0 to about 2.0 moles of chelating agent per gram-atom of metal ion in the catalyst.

10. The process of claim 1 wherein the aromatic ring of the aromatic amine may be substituted by one or more halogen atoms or lower alkyl or aryl groups.

11. The process of claim 1 wherein the aromatic amine is selected from o-aminophenol, p-aminophenol, o-phenylenediamine, p-phenylenediamine, p-N-methylaminophenol sulfate, 2,6-dichloro-1,4 phenylenediamine, N,N-di-isopropyl-p-phenylenediamine, N,N'-diphenyl-p-phenylenediamine, and mixtures thereof.

12. The process of claim 1 wherein the aromatic amine is present in the amount of from about 1 to 10 pounds per thousand pounds of polyphenylene ether.

13. The process of claim 12 wherein the aromatic amine is present in an amount of from about 3 to 5 pounds per thousand pounds of polyphenylene ether.

14. The process of claim 1 wherein the reaction solution is also contacted with a reducing agent.

15. A process as defined in claim 14 wherein the reducing agent is sulfur dioxide, a salt of sulfur dioxide, a salt containing a lower valent state metal of a higher oxyacid or hydroacid, hydroxylamine, hydrazine, glucose, esters of phosphoric acid, or a mixture of any of the foregoing.

16. The process of claim 15 wherein the reducing agent is sodium sulfite.

17. The process of claim 14 wherein the reducing agent is present in an amount sufficient to provide at least about two moles per gram-atom of metal ion in the catalyst.

18. The process of claim 1 wherein the polyphenylene ether is a poly(2,6-dimethyl-1,4-phenylene)ether having an average of at least 50 repeating units.

19. The process of claim 1 wherein the metal ion component of said complex catalyst is a copper ion.

20. The process of claim 1 wherein the reaction solution comprises a phenol, a copper salt-amine complex catalyst, and an aromatic solvent.

21. The process of claim 1 wherein the reaction solution is capable of liquid-liquid extraction with an aqueous solution and wherein the chelate compound is separated by extraction with an aqueous medium.

22. The process of claim 1 wherein the reaction solution is capable of liquid-liquid extraction with an aqueous solution and the chelating agent is added in an aqueous solution to extract the metallic catalyst and thereafter the mixture is separated by centrifuging or decanting to obtain a catalyst free polymer solution.

23. The process of claim 1 wherein the reaction solution is also contacted with a reducing agent selected from the group of sulfur dioxide, a salt of sulfur dioxide, a salt containing a lower valent state metal of a higher oxyacid or hydroacid, hydroxylamine, hydrazine, glucose, esters of phosphoric acid, and mixtures thereof.

24. In a process for forming a polyphenylene ether by an oxidative coupling reaction in the presence of a chelatable metal ion-amine complex catalyst comprising passing an oxygen-containing gas through a reaction solution of a phenol and said catalyst, the improvement which comprises terminating the reaction and stabilizing the polymer against molecular weight degradation by contacting the reaction solution with (i) a chelating agent selected from the group of sodium potassium tartrate, nitrilotriacetic acid, citric acid, glycine, polyalkylenepolyamine polycarboxylic acid, an aminopolycarboxylic acid, aminocarboxylic acid, a polycarboxylic acid, or an alkali metal salt, an alkaline earth metal salt, or mixed alkali metal-alkaline earth metal salt thereof or a polyamine of the formula:

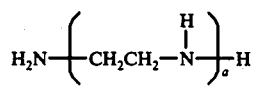

wherein $a$ is a whole number of from 1 to 5, the chelating agent being present in an amount of from 0.1 mole to about 100 moles per mole of metal ion in the reaction solution, in combination with (ii) an aromatic amine, the aromatic amine being present in an amount of from about 1 to about 20 pounds per thousand pounds of polyphenylene ether, and recovering the polyphenylene ether from the reaction solution.

25. In a process for forming a polyphenylene ether by an oxidative coupling reaction in the presence of a chelatable metal ion-amine complex catalyst comprising passing an oxygen-containing gas through a reaction solution of a phenol and said catalyst, the improvement which comprises terminating the reaction and stabilizing the polymer against molecular weight degradation by contacting the reaction solution with (i) a chelating agent for such ion, the chelating agent being present in an amount sufficient to provide from about 1.0 to about 2.0 moles of chelating agent per gram-atom of metal ion in the catalyst, in combination with (ii) an aromatic amine, the aromatic amine being present in an amount of from about 1 to about 10 pounds per thousand pounds of polyphenylene ether, and recovering the polyphenylene ether from the reaction solution.

* * * * *

UNITED STATES PATENT AND TRADEMARK OFFICE
CERTIFICATE OF CORRECTION

PATENT NO. : 4,116,939
DATED : September 26, 1978
INVENTOR(S) : Glenn Dale Cooper and Daniel Edwin Floryan It is certified that error appears in the above-identified patent and that said Letters Patent are hereby corrected as shown below:

Col. 1, line 31, "olyphenylene" should read -- polyphenylene --

Col. 3, line 67, "hudrocarbons" should read -- hydrocarbons --

Col. 5, line 67, "tend" should read -- lend --.

Signed and Sealed this

Third Day of July 1979

[SEAL]

Attest:

LUTRELLE F. PARKER

*Attesting Officer*  *Acting Commissioner of Patents and Trademarks*